United States Patent
Takahashi

(10) Patent No.: US 12,195,351 B2
(45) Date of Patent: Jan. 14, 2025

(54) MOLYBDENUM OXYCHLORIDE OR TUNGSTEN OXYCHLORIDE AND PRODUCTION METHOD THEREOF

(71) Applicant: JX Nippon Mining & Metals Corporation, Tokyo (JP)

(72) Inventor: Hideyuki Takahashi, Ibaraki (JP)

(73) Assignee: JX ADVANCED METALS CORPORATION, Tokyo (JP)

( * ) Notice: Subject to any disclaimer, the term of this patent is extended or adjusted under 35 U.S.C. 154(b) by 983 days.

(21) Appl. No.: 16/979,021

(22) PCT Filed: Jul. 24, 2019

(86) PCT No.: PCT/JP2019/028973
§ 371 (c)(1),
(2) Date: Sep. 8, 2020

(87) PCT Pub. No.: WO2020/084852
PCT Pub. Date: Apr. 30, 2020

(65) Prior Publication Data
US 2021/0053839 A1 Feb. 25, 2021

(30) Foreign Application Priority Data
Oct. 25, 2018 (JP) .................................. 2018-200862

(51) Int. Cl.
*C01G 41/00* (2006.01)
*C01G 39/00* (2006.01)

(52) U.S. Cl.
CPC .............. *C01G 41/00* (2013.01); *C01G 39/00* (2013.01); *C01P 2006/82* (2013.01)

(58) Field of Classification Search
CPC ...... C01G 41/00; C01G 39/00; C01P 2006/82
See application file for complete search history.

(56) References Cited

U.S. PATENT DOCUMENTS

| | | | |
|---|---|---|---|
| 3,254,945 A * | 6/1966 | McGrath ................. | C22B 34/36 423/606 |
| 6,416,890 B1 | 7/2002 | Terneu et al. | |
| 9,536,782 B2 | 1/2017 | Hotta et al. | |
| 10,100,406 B2 | 10/2018 | Wu et al. | |
| 10,287,177 B1 * | 5/2019 | Ten ........................ | C01G 39/02 |

FOREIGN PATENT DOCUMENTS

| | | | |
|---|---|---|---|
| CN | 102632245 A | 8/2012 | |
| EA | 201201076 A1 * | 12/2013 | ............ C01G 39/02 |
| JP | S55-121836 A | 9/1980 | |
| JP | H04-311570 A | 11/1992 | |
| JP | H06-093314 A | 4/1994 | |
| JP | 2003-225808 A | 8/2003 | |

OTHER PUBLICATIONS

Dang, Jie, et al. "Kinetics and mechanism of hydrogen reduction of MoO3 to MoO2." International Journal of Refractory Metals and Hard Materials 41 (2013): 216-223.*
Acha, Esther, Ion Agirre, and V. Laura Barrio. "Development of High Temperature Water Sorbents Based on Zeolites, Dolomite, Lanthanum Oxide and Coke." Materials 16.7 (2023): 2933.*
R. L. Graham et al., "Heats of Formation of Molybdenum Oxychlorides", J. Phys. Chem., vol. 63, pp. 723-724, May 1959.
R. R. Schrock et al., "Synthesis of Molybdenum Imido Alkylidene Complexes and Some Reactions Involving Acyclic Olefins", J. Am. Chem. Soc., vol. 112, No. 10, pp. 3875-3886, May 1990.
R. Colton et al., "Oxide Halides of Molybdenum and Tungsten", Aust. J. Chem., vol. 18, pp. 447-452, 1965 (month unknown) (Abstract only).
Y. Monteil et al., "Raman and Thermodynamics Studies of CVT of MoO2 and TiO2", Journal of Crystal Growth, vol. 67, No. 3, pp. 595-606, Aug. 1984.
Extended European Search Report issued in EP Patent Application No. 19875969.8 on Oct. 12, 2021.
Decision of Refusal issued in corresponding JP Application No. 2020-519815 on Nov. 16, 2021.
Epperson, Edward Roy, "The Binary Halides of Molybdenum(IV) and Tungsten(IV) and the Oxochlorides of Tungsten(VI)", University of the Pacific Theses and Dissertations, Jun. 1965.

* cited by examiner

*Primary Examiner* — Richard M Rump
(74) *Attorney, Agent, or Firm* — Howson & Howson LLP

(57) ABSTRACT

A molybdenum oxychloride or a tungsten oxychloride, wherein the molybdenum oxychloride or the tungsten oxychloride has a moisture content of less than 1 wt %. A method of producing a molybdenum oxychloride or a tungsten oxychloride, wherein a molybdenum oxide or a tungsten oxide as a raw material is subject to dehydration treatment at 400° C. or higher and 800° C. or less, and the raw material that underwent dehydration treatment is thereafter reacted with a chlorine gas to synthesize a molybdenum oxychloride or a tungsten oxychloride. An object of the present invention is to provide a molybdenum oxychloride or a tungsten oxychloride having a low moisture content, as well as a production method thereof.

2 Claims, No Drawings

MOLYBDENUM OXYCHLORIDE OR TUNGSTEN OXYCHLORIDE AND PRODUCTION METHOD THEREOF

BACKGROUND

The present invention relates to a molybdenum oxychloride or a tungsten oxychloride which can be suitably used as a vapor phase growth material of a thin film or a chemical reaction catalyst, as well as to a method of producing such molybdenum oxychloride or tungsten oxychloride.

Contact plugs, wires, or thin films such as diffusion barrier layers under wires used in semiconductor devices and other functional electronic devices are formed from physically and chemically stable low-resistance metal materials such as molybdenum (Mo) and tungsten (W), or compounds of those metals such as nitrides and carbides. Furthermore, in recent years, in addition to the uses described above, a two-dimensionally structured ultrathin film made from $MoS_2$, which exhibits semiconductor properties, is also attracting attention as a novel metal chalcogenide material.

The thin film of molybdenum or tungsten or a compound thereof described above is formed via the chemical vapor deposition (CVD) method or the atomic layer deposition (ALD) method which vaporizes a compound containing the respective elements as a precursor, causes the product to decompose and react on the substrate surface, and thereby forms a thin film. As the precursor compound to be used in forming the metal or metal compound in the CVD method or the ALD method, used is the halide or the like of metal.

For example, Patent Document 1 describes forming a $MoS_2$ film by using a molybdenum chloride ($MoCl_5$). Moreover, Patent Document 2 describes depositing a metal film by supplying a metal chloride ($WCl_6$, $WCl_5$, $WCl_4$) gas, and a reducing gas such as $H_2$. Moreover, Patent Document 3 discloses a method of depositing a metal or its compound based on the CVD method which uses a metal fluoride ($WF_6$, $MoF_6$) as the raw material.

Meanwhile, as an approach that is different from the above, for example, Patent Document 4 discloses a method of depositing molybdenum or a molybdenum compound via the CVD method by using a molybdenum oxychloride ($MoO_2Cl_2$ or $MoOCl_4$) as the raw material precursor. This molybdenum oxychloride powder is synthesized mainly by directly chloridating a molybdenum oxide ($MoO_3$) powder with a chlorine gas ($Cl_2$).

CITATION LIST

Patent Documents

[Patent Document 1] Japanese Unexamined Patent Application Publication No. 2003-225808
[Patent Document 2] Japanese Unexamined Patent Application Publication No. 2015-193908
[Patent Document 3] Japanese Unexamined Patent Application Publication No. H4-311570
[Patent Document 4] Japanese Unexamined Patent Application Publication No. 2000-119045

SUMMARY

Technical Problem

Since the oxychloride of molybdenum or tungsten has extremely high hygroscopicity, a hydrate is sometimes formed when there is moisture, and when there is a large amount of moisture, there are cases where it deliquesces and generates hydrochloric acid (HCl). In light of the above, an object of the present invention is to provide a molybdenum oxychloride or a tungsten oxychloride having a low moisture content, as well as a production method thereof.

As a result of intense study, the present inventors discovered that, by subjecting the molybdenum oxide or the tungsten oxide as the raw material to dehydration treatment under predetermined conditions, it is possible to reduce the moisture content contained in the molybdenum oxychloride or the tungsten oxychloride that is obtained through synthesis thereafter. Based on the foregoing discovery, the present disclosure provides the following molybdenum oxychloride or tungsten oxychloride and the production method thereof.

1) A molybdenum oxychloride or a tungsten oxychloride, wherein the molybdenum oxychloride or the tungsten oxychloride has a moisture content of less than 1 wt %.

2) The molybdenum oxychloride or the tungsten oxychloride according to 1) above, wherein the molybdenum oxychloride or the tungsten oxychloride has a purity of 5N or higher.

3) A method of producing a molybdenum oxychloride or a tungsten oxychloride, wherein a molybdenum oxide or a tungsten oxide as a raw material is subject to dehydration treatment at 400° C. or higher and 800° C. or less, and the raw material that underwent dehydration treatment is thereafter reacted with a chlorine gas to synthesize a molybdenum oxychloride or a tungsten oxychloride.

4) The method of producing a molybdenum oxychloride or a tungsten oxychloride according to 3) above, wherein the dehydration treatment time is set to be 3 hours or longer.

According to the present disclosure, it is possible to provide a molybdenum oxychloride or a tungsten oxychloride having a low moisture content, as well as a production method thereof.

DETAILED DESCRIPTION

When depositing molybdenum or a molybdenum compound or tungsten or a tungsten compound via the CVD method or the ALD method, a molybdenum oxychloride ($MoO_2Cl_2$, $MoOCl_3$ or the like) or a tungsten oxychloride ($WO_2Cl_2$, $WOCl_4$ or the like) is used as the precursor. A molybdenum oxychloride or a tungsten oxychloride is synthesized by chloridating a molybdenum oxide ($MoO_2$, $MoO_3$) or a tungsten oxide ($W_2O_3$, $WO_2$, $WO_3$) as a raw material with a chlorine gas ($Cl_2$).

However, since the oxychloride of molybdenum or tungsten has extremely high hygroscopicity, a hydrate is sometimes formed when there is moisture, and when there is a large amount of moisture, there are cases where it deliquesces and generates hydrochloric acid (HCl). Accordingly, when these powders containing a large amount of moisture are used as the precursor in the CVD method or the ALD method, there were cases where the powders would decompose within the vessel and cause the corrosion of the vessel, or the hydrate would become adhered to the substrate as particles and affect the product characteristics.

In light of the above, as a result of intense study to reduce the moisture content contained in the molybdenum oxychloride or tungsten oxychloride, the present inventors discovered that, by subjecting the molybdenum oxide ($MoO_2$, $MoO_3$) or the tungsten oxide ($W_2O_3$, $WO_2$, $WO_3$) as the raw material to dehydration treatment under predetermined conditions, it is possible to reduce the moisture content contained in the molybdenum oxychloride or the tungsten oxychloride that is obtained through synthesis thereafter. Consequently, it became possible to reduce the hydrate contained in the precursor after the foregoing synthesis, and improve the yield.

The dehydration treatment is performed by placing a molybdenum oxide or a tungsten oxide as a raw material in a furnace or the like, and heating the raw material while causing an inert gas such Ar or $N_2$, or a gas in which oxygen is mixed with the inert gas, or air ($O_2+N_2$) to flow therein. Here, the heating temperature is preferably set to 400° C. or higher and 800° C. or less. When the heating temperature is less than 400° C., it is not possible to sufficiently volatilize the moisture contained in the raw material, and the moisture content contained in the oxychloride of molybdenum/tungsten that is subsequently synthesized cannot be sufficiently reduced. Meanwhile, when the heating temperature exceeds 800° C., this is undesirable as the molybdenum oxide or tungsten oxide will melt or become partially sublimated. More preferably, the heating temperature is 500° C. or higher and 750° C. or less.

The flow rate of the introduced gas is preferably 0.1 to 100 L/min. When the flow rate is less than 0.1 L/min, it is insufficient to discharge the moisture from within the system, and is dangerous as the re-condensed moisture may flow backward. Meanwhile, when the flow rate exceeds 100 L/min, this is undesirable since a large amount of gas is consumed and will result in high costs, and there are problems in that the product is strongly reduced and oxygen-deficient $Mo_4O_{11}$ or the like is formed. Moreover, the dehydration treatment is preferably performed for 3 hours or longer. As a result of performing dehydration treatment at a high temperature for a long period, it is possible to sufficiently reduce the moisture content contained in the molybdenum oxychloride or the tungsten oxychloride after synthesis. Moreover, the treatment time is preferably adjusted in consideration of the heating temperature, and, for example, the heat treatment time can be shortened while setting the heating temperature to be a relatively high temperature. More preferably, the treatment time is 10 hours or longer.

Synthesis of the molybdenum oxychloride is performed by causing a chlorine ($Cl_2$) gas to flow at a predetermined flow rate to the molybdenum oxide powder ($MoO_2$ powder, $MoO_3$ powder) that was subject to the heat treatment under the foregoing conditions, and causing the molybdenum oxychloride of a gas phase, which is generated based on the reaction thereof, to precipitate in a solid phase. Here, the heating temperature of the molybdenum oxide during the reaction is preferably set to 700° C. or higher. The molybdenum oxychloride of the gas phase generated based on the reaction can be precipitated in a solid phase by being cooled.

Moreover, synthesis of the tungsten oxychloride is performed by causing a chlorine ($Cl_2$) gas to flow at a predetermined flow rate to the tungsten oxide powder ($W_2O_3$, $WO_2$, $WO_3$) that was subject to the heat treatment under the foregoing conditions, and causing the tungsten oxychloride of a gas phase, which is generated based on the reaction thereof, to precipitate in a solid phase. Here, the heating temperature of the tungsten oxychloride during the reaction is preferably set to 700° C. or higher. The tungsten oxychloride of the gas phase generated based on the reaction can be precipitated in a solid phase by being cooled.

Based on the foregoing method, it is possible to cause the moisture content after synthesis contained in the molybdenum oxychloride or the tungsten oxychloride to be less than 1 wt %. As a result of using the molybdenum oxychloride or the tungsten oxychloride having a low moisture content as the precursor of CVD or ALD, the deposition yield can be improved. Furthermore, based on the foregoing method, the residue generated during sublimation can be reduced, and it is possible to cause the purity of the molybdenum oxychloride or the tungsten oxychloride to be 99.999 wt % (5N) or higher.

The various evaluation methods in the present disclosure are as follows including the Examples and Comparative Examples.

(Moisture Content)
Foremost, an X-ray diffraction device (XRD) is used to confirm the nonexistence of an unintended low-grade chloride (for instance, $MoO_2Cl$ or $MoOCl_4$). Next, a thermogravimetry mass spectrometer (TG-MS) is used to measure the weight change, and then the moisture content is calculated from the residue weight ratio on the assumption that this is a hydrate. Furthermore, an ICP optical emission spectroscopy analyzer (ICP-OES) is used to measure the amount of molybdenum or tungsten as the main component, and the moisture content is calculated from the difference from the theoretical value.

However, since all of these methods involve assumptions and it is difficult to completely eliminate uncertainties, the reliability of the measured moisture content can be improved by confirming that the moisture contents obtained from the different methods (TG-MS and ICP-OES) indicate the same value.

(Purity)
The purity in the present disclosure is defined as a value obtained by analyzing the elements which are anticipated as being contained as impurities in the molybdenum oxychloride or the tungsten oxychloride, and subtracting the total content of the elements that appeared in a content of a detection limit or higher from 100 wt %. Here, the impurity elements are Be, Mg, Al, K, Ga, Ge, As, Sr, Ba, W, Ti, U, Ag, Na, Co, Fe, In, Mn, Ni, Pb, Zn, Cu, Cr, Tl, Li, Th, Sc, Se, Hf, Ta, and Bi, and among these element K is analyzed based on Atomic Absorption Spectroscopy (AAS), and the elements other than K are analyzed based on Inductively Coupled Plasma-Mass Spectrometry (ICP-MS). The content of the detection limit in the analysis of the present invention is 0.5 wtppm for Ni and Se, and 0.1 wtppm for each of the other foregoing elements. Note that the purity is calculated by deeming that impurity elements of a content that is less than the measurement limit are not substantially contained.

EXAMPLES

The present invention is now explained based on the following Examples and Comparative Examples. These Examples are illustrative only, and the present invention is not limited in any way based on the Examples. In other words, the present invention is limited only by the scope of its claims, and covers the various modifications other than the Examples included in the present invention.

Example 1

490 g of a $MoO_3$ raw material was placed in a ring furnace (φ150 cm), and dehydration treatment was performed by heating the $MoO_3$ raw material at 550° C. for 20 hours while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized molybdenum oxychloride was thereafter recovered. As a result of measuring the moisture content of the thus obtained molybdenum oxychloride, the result was 0.1 wt %, and a molybdenum oxychloride having a low moisture content was obtained. Moreover, the purity was 99.999% or higher, and a molybdenum oxychloride having a high purity was obtained.

Example 2

490 g of a $MoO_3$ raw material was placed in a ring furnace (φ150 cm), and dehydration treatment was performed by heating the $MoO_3$ raw material at 550° C. for 20 hours while introducing an Ar gas under the condition of a flow rate of 5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized molybdenum oxychloride was thereafter recovered. As a result of measuring the moisture content of the thus obtained molybdenum oxychloride, the result was 0.01 wt %, and a molybdenum oxychloride having a low moisture content was obtained. Moreover, the purity was 99.999% or higher, and a molybdenum oxychloride having a high purity was obtained.

Example 3

490 g of a $WO_3$ raw material was placed in a ring furnace (φ150 cm), and dehydration treatment was performed by heating the $WO_3$ raw material at 550° C. for 20 hours while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized tungsten oxychloride was thereafter recovered. As a result of measuring the moisture content of the thus obtained tungsten oxychloride, the result was 0.1 wt %, and a tungsten oxychloride having a low moisture content was obtained. Moreover, the purity was 99.999% or higher, and a tungsten oxychloride having a high purity was obtained.

Example 4

490 g of a $WO_3$ raw material was placed in a ring furnace (φ150 cm), and dehydration treatment was performed by heating the $WO_3$ raw material at 550° C. for 20 hours while introducing an Ar gas under the condition of a flow rate of 5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized tungsten oxychloride was thereafter recovered. As a result of measuring the moisture content of the thus obtained tungsten oxychloride, the result was 0.01 wt %, and a tungsten oxychloride having a low moisture content was obtained. Moreover, the purity was 99.999% or higher, and a tungsten oxychloride having a high purity was obtained.

Comparative Example 1

490 g of a $MoO_3$ raw material was placed in a ring furnace (φ150 cm), and dehydration treatment was performed by heating the $MoO_3$ raw material at 200° C. for 20 hours while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized molybdenum oxychloride was thereafter recovered. As a result of measuring the moisture content of the thus obtained molybdenum oxychloride, the result was 5 wt %, and the reduction effect of the moisture content was insufficient.

Comparative Example 2

490 g of a $MoO_3$ raw material was placed in a ring furnace (φ150 cm), and dehydration treatment was performed by heating the $MoO_3$ raw material at 550° C. for 1 hour while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized molybdenum oxychloride was thereafter recovered. As a result of measuring the moisture content of the thus obtained molybdenum oxychloride, the result was 2 wt %, and the reduction effect of the moisture content was insufficient.

Comparative Example 3

490 g of a $WO_3$ raw material was placed in a ring furnace (φ150 cm), and dehydration treatment was performed by heating the $WO_3$ raw material at 200° C. for 20 hours while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized tungsten oxychloride was thereafter recovered. As a result of measuring the moisture content of the thus obtained tungsten oxychloride, the result was 4 wt %, and the reduction effect of the moisture content was insufficient.

Comparative Example 4

490 g of a $WO_3$ raw material was placed in a ring furnace (φ150 cm), and dehydration treatment was performed by heating the $WO_3$ raw material at 550° C. for 1 hour while introducing an Ar gas under the condition of a flow rate of 0.5 L/min. Subsequently, the $MoO_3$ raw material that underwent dehydration treatment was placed in a reaction vessel, and synthesized by being heated at 720° C. while introducing a $Cl_2$ gas, and a $N_2$ gas as a carrier gas, in the reaction vessel. The synthesized tungsten oxychloride was thereafter recovered. As a result of measuring the moisture content of the thus obtained tungsten oxychloride, the result was 2 wt %, and the reduction effect of the moisture content was insufficient.

The foregoing results are shown in Table 1.

TABLE 1

| | Raw material | Dehydration treatment temperature | Dehydration treatment time | Ar gas flow rate | Compound (precursor) | Moisture content |
|---|---|---|---|---|---|---|
| Example 1 | $MoO_3$ | 550° C. | 20 hr | 0.5 L/min | $MoO_2Cl_2$ | 0.1 wt % |
| Example 2 | $MoO_3$ | 550° C. | 20 hr | 5 L/min | $MoO_2Cl_2$ | 0.01 wt % |
| Example 3 | $WO_3$ | 550° C. | 20 hr | 0.5 L/min | $WOCl_4$ | 0.1 wt % |
| Example 4 | $WO_3$ | 550° C. | 20 hr | 5 L/min | $WOCl_4$ | 0.01 wt % |
| Comparative Example 1 | $MoO_3$ | 200° C. | 20 hr | 0.5 L/min | $MoO_2Cl_2$ | 5 wt % |
| Comparative Example 2 | $MoO_3$ | 550° C. | 1 hr | 0.5 L/min | $MoO_2Cl_2$ | 2 wt % |
| Comparative Example 3 | $WO_3$ | 200° C. | 20 hr | 0.5 L/min | $WOCl_4$ | 4 wt % |
| Comparative Example 4 | $WO_3$ | 550° C. | 1 hr | 0.5 L/min | $WOCl_4$ | 2 wt % |

According to the present invention, it is possible to provide a molybdenum oxychloride or a tungsten oxychloride having a low moisture content, as well as a production method thereof. The present invention makes a significant technical contribution in the industrial/technical fields of semiconductors, electronic device manufacturing, functional material formation, and organic/inorganic chemicals, which form thin films or synthesize compounds by using a molybdenum oxychloride or a tungsten oxychloride as the raw material or catalyst of CVD or ALD.

The invention claimed is:

1. A method of producing a molybdenum oxychloride or a tungsten oxychloride, wherein a molybdenum oxide or a tungsten oxide as a raw material is subject to dehydration treatment at 400° C. or higher and 800° C. or less while flowing inert gas, or inert gas mixed with oxygen, or air ($O_2+N_2$), wherein the dehydration treatment time is set to be 3 hours or longer, and the raw material that underwent dehydration treatment is thereafter reacted with a chlorine gas to synthesize a molybdenum oxychloride or a tungsten oxychloride.

2. The method of producing a molybdenum oxychloride or a tungsten oxychloride according to claim 1, wherein the dehydration treatment is at a temperature of 500° C. or higher and 750° C. or less.

* * * * *